United States Patent [19]
Yoneya et al.

[11] Patent Number: 4,470,560
[45] Date of Patent: Sep. 11, 1984

[54] CASSETTE ADAPTER

[75] Inventors: Hiroshi Yoneya, Yokohama; Mitsuo Hoshino, Kasukabe, both of Japan

[73] Assignee: Sony Corporation, Tokyo, Japan

[21] Appl. No.: 413,523

[22] Filed: Aug. 31, 1982

[30] Foreign Application Priority Data

Sep. 3, 1981 [JP] Japan ............................ 56-130380[U]

[51] Int. Cl.³ .......................... G03B 1/04; G11B 15/32
[52] U.S. Cl. ...................................... 242/198; 360/94; 360/95
[58] Field of Search ......................... 242/180, 197–200; 360/85, 93–95, 96.5, 132; 352/72–78

[56] References Cited

U.S. PATENT DOCUMENTS

| Re. 29,058 | 11/1976 | Bolick, Jr. | 360/94 |
|---|---|---|---|
| 4,151,738 | 5/1979 | Shimizu et al. | 360/95 |
| 4,185,307 | 1/1980 | Sato | 360/94 |
| 4,206,487 | 6/1983 | Sato | 360/94 |
| 4,405,098 | 9/1983 | Spicer | 242/200 |
| 4,432,510 | 2/1984 | Ogata et al. | 242/200 |

FOREIGN PATENT DOCUMENTS

2091214A 7/1982 United Kingdom .
2091106A 8/1982 United Kingdom .

Primary Examiner—Leonard D. Christian
Attorney, Agent, or Firm—Lewis H. Eslinger; Alvin Sinderbrand

[57] ABSTRACT

A cassette adapter for use with an information signal recording and/or reproducing apparatus and adapted to receive a smaller cassette containing magnetic tape wound on normally locked supply and take-up reels comprises a rotational force transmission device for winding the magnetic tape on the take-up reel, and a crank device connected to the rotational force transmission device for withdrawing the magnetic tape from the smaller cassette. A reel release device can be provided to operate in synchronism with the crank device, the reel release device being operative to a first position for releasing one of the reels for rotation, and being operative to a second position for releasing both of the reels for rotation. The rotational force transmission device can control movement of the take-up reel during a rewind operation sufficient to maintain the magnetic tape in a continuously tensioned state.

16 Claims, 8 Drawing Figures

CASSETTE ADAPTER

BACKGROUND OF THE INVENTION

1. Field of the Invention

This invention relates to cassette adapters, and more particularly, to a cassette adapter for mounting a small cassette containing magnetic tape in an information signal recording and/or reproducing apparatus, such as a video cassette recorder, which uses a larger cassette.

2. Description of the Prior Art

Small or "compact" video cassettes have been developed for use with portable television cameras and recorders to reduce size and weight. The compact cassette is smaller in size than a conventional video cassette, and thus cannot be directly received in a video cassette recorder that uses conventional video cassettes. In order to operate with a compact cassette on the conventional size video cassette recorder, a cassette adapter must be used therewith.

In a compact cassette, magnetic tape is wound between a supply reel and take-up reel. The supply and take-up reels are normally locked from rotating when the compact cassette is not in use.

In a compact cassette adapter for enabling a compact cassette to be used in a record/playback unit which normally uses a larger cassette, one or both of the supply and take-up reels of the compact cassette must be released from the locked state during a tape loading operation, in which the magnetic tape is unwound from one or both reels, withdrawn from the compact cassette, and guided into the adapter. However, the position of the loaded magnetic tape can become unstable, i.e., it may not be properly aligned and tensioned in the adapter during the loading operation.

Furthermore, if both the supply and take-up reels are not locked after completion of the loading operation, the magnetic tape can become slack, making it difficult for the record/playback unit to operate on the tape. Of course, the reels must be unlocked after the adapter is mounted in the unit to carry out a record and/or playback operation.

OBJECTS AND SUMMARY OF THE INVENTION

It is an object of the present invention to provide an adapter which permits a small or compact cassette to be played in an information signal recording and/or reproducing apparatus of the type which normally operates with larger cassettes.

Another object of this invention is to provide an improved adapter for use in a video cassette record/reproducing device which overcomes the aforementioned disadvantages.

It is another object of the present invention to provide a compact cassette adapter which is capable of correctly loading magnetic tape from a compact cassette into the adapter.

In accordance with this invention, a cassette adapter is provided for use with a cassette-type information signal recording and/or reproducing apparatus. The adapter functions to receive a smaller cassette containing magnetic tape wound on normally locked supply and take-up reels. A rotational force transmission device is included in the adapter for winding the magnetic tape on the take-up reel, and a crank device connected to the rotational force transmission device withdraws the magnetic tape from the smaller cassette. A reel release device can be provided to operate in synchronism with the crank device to a first position for releasing one of the reels for rotation and to a second position for releasing both of the reels for rotation. The rotational force transmission device controls rotation of the take-up reel of the smaller cassette during a rewind operation sufficient to maintain the magnetic tape in a continuously tensioned state.

The above, and other objects, features and advantages of the invention will be apparent from the following detailed description of an illustrative embodiment thereof, which is to read in connection with the accompanying drawings.

DESCRIPTION OF THE PREFERRED EMBODIMENT

Figure 1:
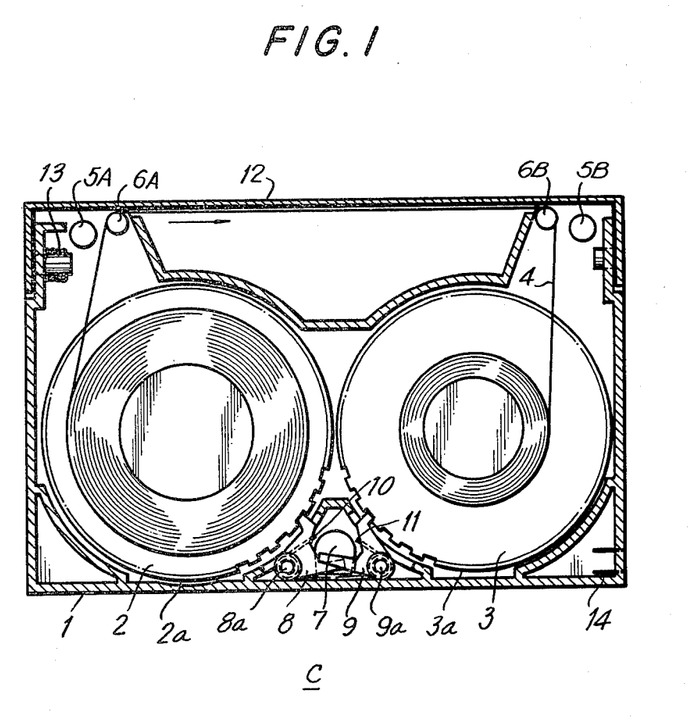
FIG. 1 is a cutaway, plan view of a small or compact cassette containing magnetic tape on supply and take-up reels.

In FIG. 1, a small or "compact" cassette C for use with an information signal recording and/or reproducing apparatus includes a casing or housing 1 containing a supply reel 2, hereinafter referred to as an S reel, and a take-up reel 3, hereinafter referred to as a T reel. S and T reels 2, 3 each have integrally formed hubs. Locking teeth 2a and 3a, respectively, are formed on the periphery of S and T reels 2, 3. A magnetic tape 4 is wound on the S and T reels 2, 3, and guide pins 5A, 5B, 6A and 6B define a run between the supply and take-up reels. A hole or aperture 7 for receiving a lock release pin 46 of the adapter to be described below is formed at least through the bottom wall of housing 1 between S and T reels 2, 3. Locking pawls 8, 9 are pivotally mounted on stationary pins 8a and 9a, respectively. One end of each of pawls 8, 9 opposes aperture 7, while the other end thereof is biased by torsion springs 10, 11, respectively, so as to engage with locking teeth 2a and 3a. A pivotal cover 12 is biased in the closed position by a spring 13 to close an opening of housing 1 and thereby form the front wall thereof. An accidental erase protector 14 is formed in at least two surfaces of compact cassette C, such as the bottom and side walls.

Figure 2A:
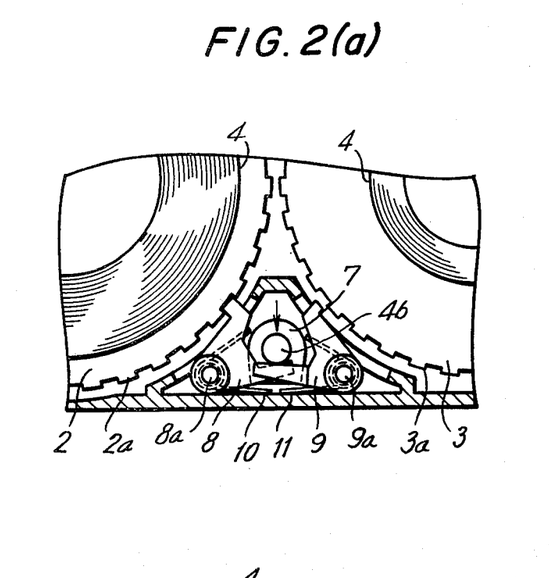
FIGS. 2(a) and 2(b) illustrate the locking operation of the supply and take-up reels of the compact cassette of FIG. 1.
Figure 2B:
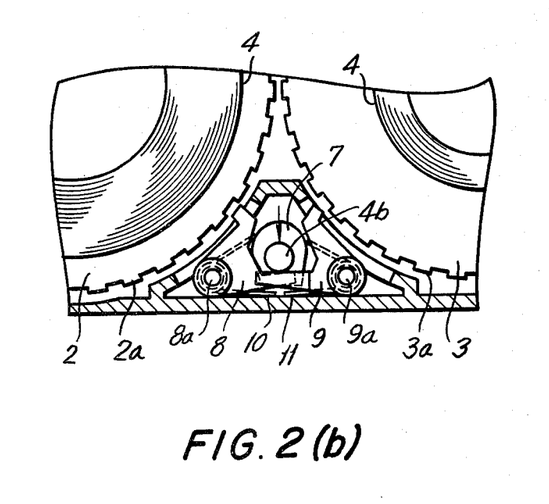

FIGS. 2(a) and 2(b) illustrate the operation of locking pawls 8, 9 for selectively preventing the rotation of S and T reels 2, 3. Since locking pawls 8, 9 are biased by torsion springs 10, 11 to engage with locking teeth 2a, 3a, the S and T reels normally are locked from rotating. Accordingly, magnetic tape 4 normally is tautly positioned within compact cassette C and cannot become slack.

When compact cassette C is positioned for loading within a compact cassette adapter, to be described more fully hereinbelow, lock release pin 46 normally provided in the adapter projects through hole or aperture 7 and moves a small amount in the direction indicated by the arrow in FIGS. 2(a) and (b) to drive one end of locking pawl 9 such that this locking pawl pivots against the biasing force of torsion spring 11 to disengage the other end from teeth 3a of T reel 3, and the T reel thus is free to rotate.

When an adapter having compact cassette C loaded therein is mounted on an information signal recording and/or reproducing apparatus, such as a video cassette recorder, lock release pin 46 moves further in the indicated direction to drive both locking pawl 8 as well as locking pawl 9, as shown in FIG. 2(b). Consequently, both locking pawls 8, 9 pivot against the biasing force of torsion springs 10, 11, and now locking teeth 2a of S reel 2 are disengaged from locking pawl 8; and both S and T reels 2, 3 are free to rotate.

It should be noted that when compact cassette C is mounted directly (i.e. without a compact cassette adapter) in a suitable information signal recording and/or reproducing apparatus, such as a portable television camera with recording capability, pawls 8 and 9 are pivotally driven to disengage teeth 2a and 3a and permit reels 2, 3 to freely rotate.

Figure 3A:
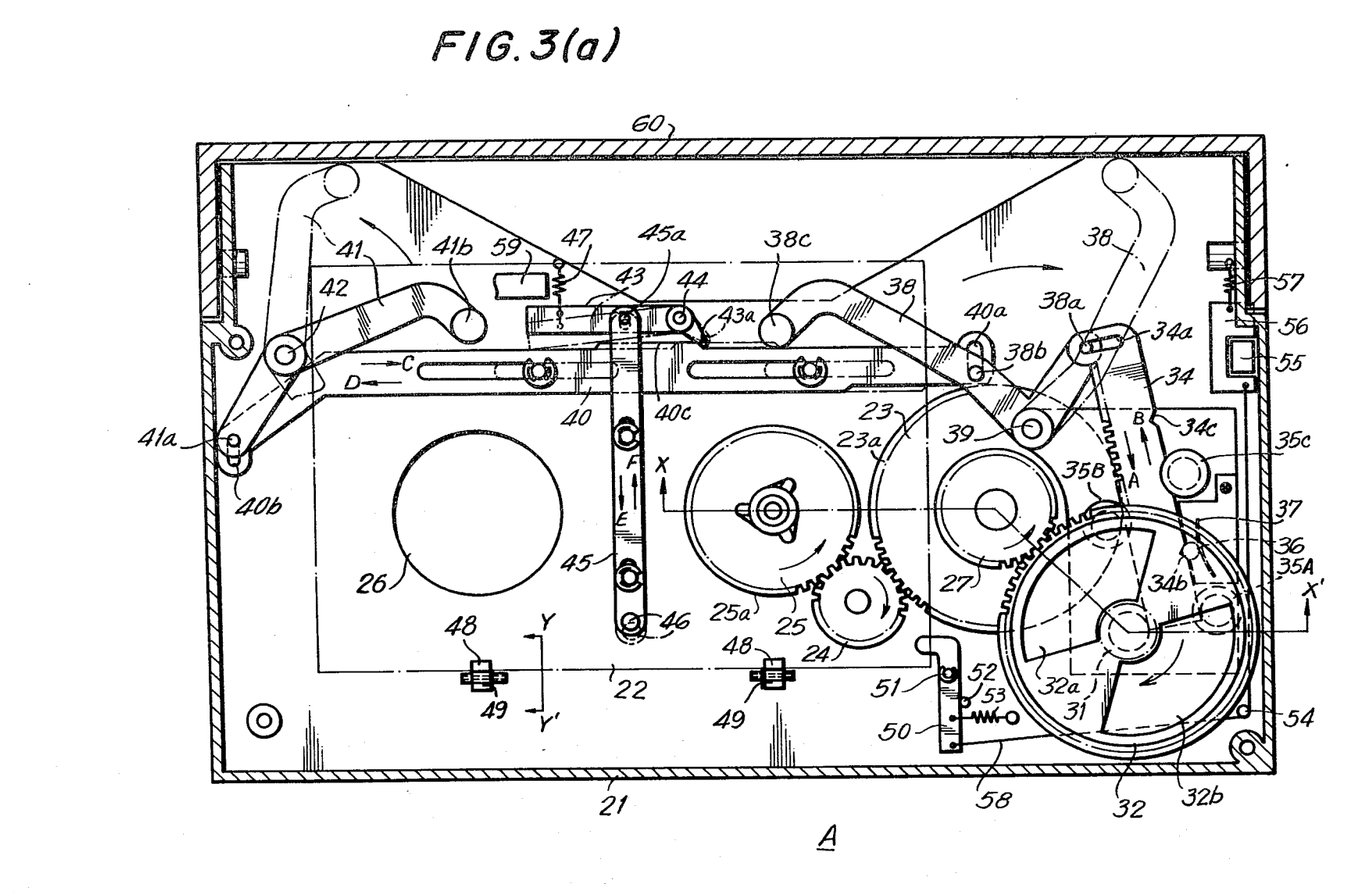
FIG. 3(a) is a cutaway, plan view of an embodiment of a compact cassette adapter in accord with the present invention.

FIG. 3(a) illustrates an embodiment of a compact cassette adapter A in accord with the present invention for use with a compact cassette C in an information signal recording and/or reproducing apparatus. A casing or housing 21 of cassette adapter A includes a recess 22 for receiving compact cassette C. A hub 23 is adapted to be coupled to a drive shaft of, for example, a video cassette recorder (not shown), and has teeth 23a formed around its periphery for meshing with an idler 24 which, in turn, meshes with teeth 25a of an impeller 25 for driving the take-up reel of a received compact cassette. A hole or aperture 26 is adapted to receive the usual supply reel drive shaft of the video cassette recorder.

Figure 3B:
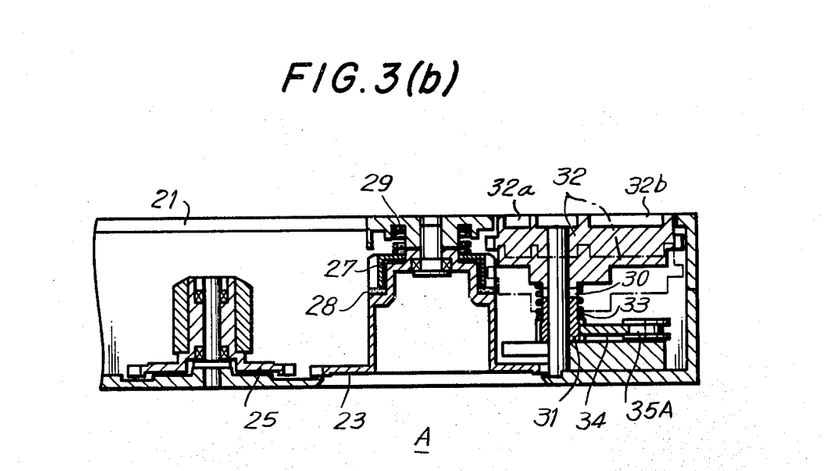
FIG. 3(b) is a sectional view of the compact cassette adapter taken along the lines X—X' of FIG. 3(a)

As shown in FIGS. 3(a) and 3(b), a gear 27 is coaxially positioned on hub 23 and is coupled thereto through a clutch 28 and a spring 29 (FIG. 3(b)). Gear 27 meshes with a manually rotatable gear 32 when the latter is pressed downwardly, as viewed in FIG. 3(b) to overcome the upward bias normally provided by a spring 33.

Recesses 32a, 32b are formed on a top surface of manually rotatable gear 32 to receive the operator's finger. A member 30 is formed at the lower-end of gear 32 having a portion which coacts with an upper end of a pinion 31 when gear 32 is depressed. When an operator inserts a finger into recess 32a or 32b of manually rotatable gear 32 and presses downwardly while imparting rotation thereto, manually rotatable gear 32 meshes with gear 27 to rotate hub 23 through clutch 28, and member 30 engages pinion 31 for rotation thereby. A rack 34 meshes with pinion 31 and is slidably guided by guides 35A, 35B and 35C. The rack has an elongate hole 34a and notches 34b and 34c are formed in one edge thereof. A ball or detent 36, urged by a leaf spring 37, abuts against this edge and is adapted to be received by notches 34b or 34c to regulate the sliding position of rack 34.

As shown in FIG. 3(a), a crank mechanism including a pivot arm 38 is pivotally mounted by a pin 39 within housing 21 and is coupled at one end thereof to rack 34 by engagement between a pin 38a mounted on that one end and elongate hole 34a of the rack. An intermediate portion of pivot arm 38 is coupled to a transversely slidable lever 40 through engagement of a pin 38b mounted on this arm and an elongate hole 40a provided in one end of the lever. A guide pin 38c is provided at the other end of arm 38 for guiding magnetic tape from a compact cassette received by the adapter to a loading position. Another pivot arm 41 is pivotally mounted in housing 21 by a pn 42 and is coupled to slide lever 40 through engagement of a pin 41a mounted on this arm and another elongate hole 40b formed in the other end of the lever. A guide pin 41b is provided at the free end of arm 41 for guiding magnetic tape in a manner similar to pivot arm 38.

A control lever 43 is pivotally supported on a pin 44 within housing 21. A distal end 43a of this control lever is urged by a spring 47 against a projection or shoulder 40c formed at an intermediate position of slide lever 40. A locking lever 45 is coupled at one end to control lever 43 through a pin 45a and is provided at its other end with lock release pin 46, as hereinbefore described.

Figure 3C:
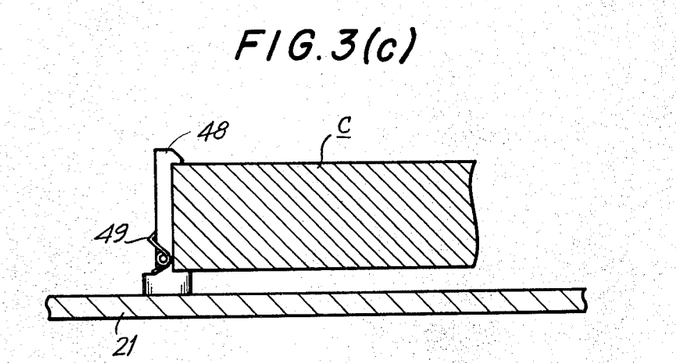
FIG. 3(c) is a sectional view of the compact cassette adapter taken along the lines Y—Y' of FIG. 3(a)

A locking member 48 is provided within housing 21 for retaining a compact cassette within the adapter. As best shown in FIG. 3(c), a torsion spring 49 locks a side surface of the compact cassette with locking member 48 when the compact cassette is positioned within cassette adapter A.

An accidental erasing protector 50 (referred to as an erase protector or protector) is a lever pivotally mounted within cassette adapter A by a pin 51 and has one end located to engage with an erase tab normally provided on a compact cassette. A spring 53 urges one end of protector 50 counter-clockwise against a stopper 52. When a compact cassette having an erase-tab is loaded into the adapter, the end of the erase protector engages this erase-tab to overcome the bias of spring 53, and lever 50 pivots clockwise to pull a wire 58 connected to a distal end thereof which wire is connected to a movable member 56 to urge this movable member 56 against a biasing force of a spring 57, whereby the movable member closes an opening 55 formed in housing 21 to prevent accidental erasing of the magnetic tape in the compact cassette.

Figure 4:
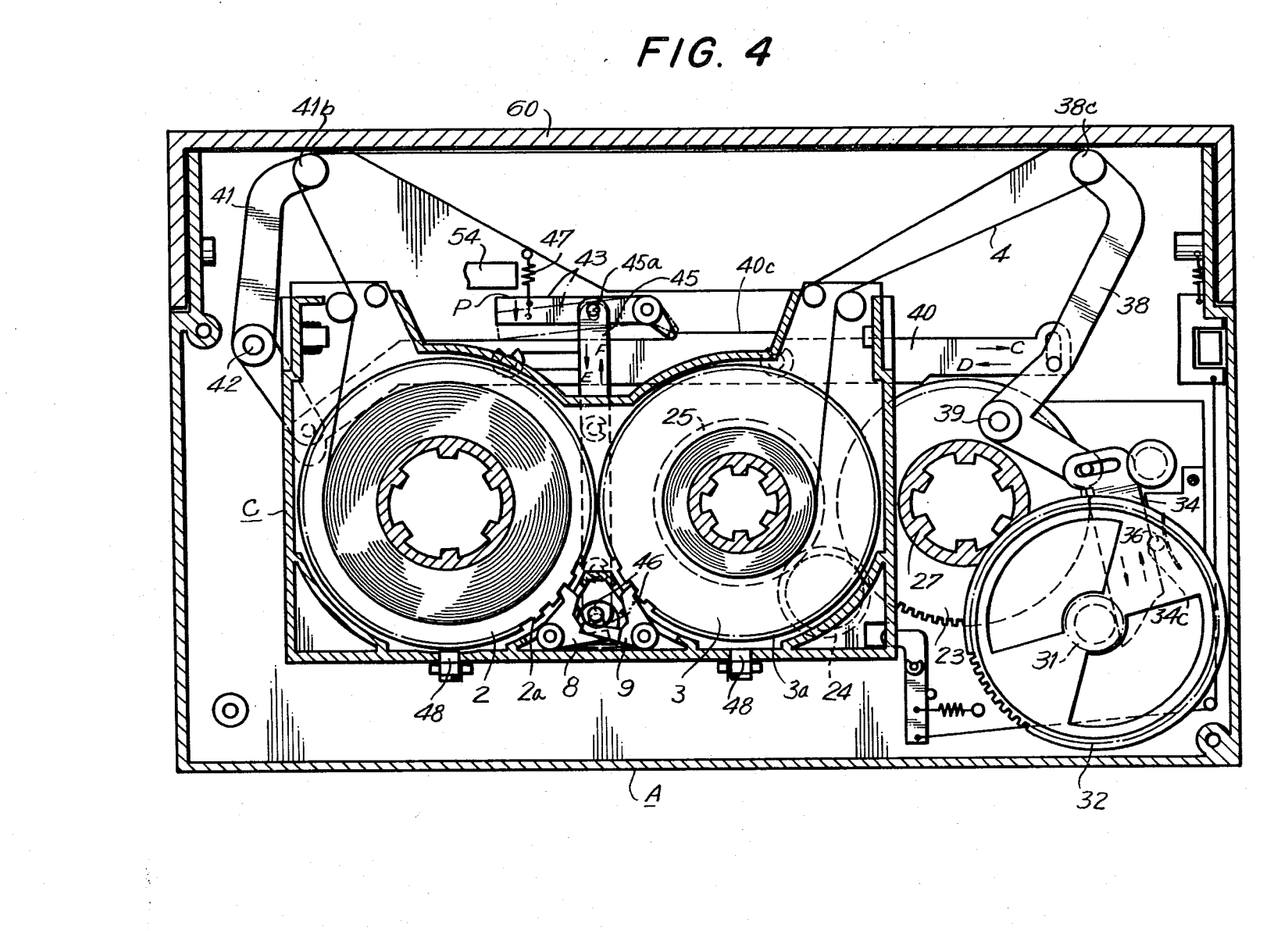
FIG. 4 is a cutaway, plan view of the compact cassette adapter of FIG. 3(a) with a compact cassette inserted therein.

The loading of a compact cassette C into cassette adapter A will now be described. The compact cassette is inserted into recess 22 of the adapter with pivotal cover 12 of the cassette in its open position. For example, the user can open the pivotal cover while simultaneously loading the compact cassette into the adapter. The user then inserts his fingers into recesses 32a, 32b of manually rotatable gear 32 and manually rotates this gear while concurrently pressing it downwardly. Consequently, pinion 31 is rotatably driven to slide rack 34 in the direction indicated by arrow A (FIG. 3A) whereby arm 38 pivots clockwise about pin 39 such that guide pin 38c moves in a direction to draw magnetic tape 4 from compact cassette C (FIG. 4). The clockwise rotation of arm 38 drives slide lever 40 to slide in the direction indicated by arrow C, whereby pivot arm 41 pivots about pin 42 in the counter-clockwise direction. As a result of this sliding movement of slide lever 40, projection or shoulder 40c engages end 43a of control lever 43 to pivot the control lever so as to drive locking lever 45 in the direction indicated by arrow E. Hence, lock release pin 46 presses against and unlocks locking pawl 9 for T reel 3, thereby enabling the rotation of arm 38 and guide pin 38c to withdraw magnetic tape 4 from the compact cassette. When manually rotatable gear 32 is rotated still further, rack 34 is driven to the position whereby ball 36 fits into notch 34c of the rack, as shown in FIG. 4, thereby locking the position of rack. In this position, rack 34 will have driven pivot arms 38, 41 to their respective extended positions, as indicated by the broken line of FIG. 3 and as shown in FIG. 4, to tension or tautly disposed magnetic tape 4 within adapter A for subsequent loading in a video cassette recorder. It is appreciated that when gear 32 is rotated to drive rack 34 and arm 38 to the position illustrated in FIG. 4, and distal end 43a of control lever 43 rides over projection or shoulder 40c, control lever 43 pivots in the counter-clockwise direction under the bias urged thereon by spring 47 to move locking lever 45 in the direction indicated by arrow F, thereby locking T reel 3 with locking pawl 9.

Let it be assumed that adapter A having compact cassette C therein is loaded (as a conventional video cassette) into a video cassette recorder. When cover 60 of the adapter (which is similar to the cover of a conventional video cassette) is pivotally opened in the recorder, a release member 59 pivots in synchronism with cover 60 to enable a mechanism (not shown) to press downwardly at point P of control lever 45 (see FIG. 4) so as to move locking lever 45 in the direction of arrow E to its extreme end, whereupon locking pawls 8, 9 within the compact cassette C are simultaneously driven by lock release pin 46 to release both S and T reels 2, 3.

Preferably, when the magnetic tape in a compact cassette is rewound on the supply reel, a short length of tape, or a leader, remains wound on the take-up reel to prevent the tape from being highly tensioned or broken when it is pulled by the pivoting of arms 38, 41 as manually rotatable gear 32 is turned. One of ordinary skill in the art will recognize that the system controller of a video cassette recorder can perform suitable action (such as forward wind) immediately after detecting when the magnetic tape has been fully rewound. Alternatively, the rewinding operation of the video cassette recorder can be stopped just before the magnetic tape is completely rewound from the take-up reel so that at least a short length of tape remains thereon.

As a further precaution, a tape tension detector may be provided to detect the accidental tensioning of magnetic tape within the adapter for stopping the pivoting of arms 38, 41. The detector also may sound a warning to apprise the operator of excess tape tension. This tape tension detector may be advantageous if an unused compact cassette is loaded into the cassette adapter, wherein the magnetic tape is completely rewound onto the supply reel, or if the user manually rewinds the magnetic tape onto the supply reel. Generally, however, the magnetic tape is not so tightly wound onto the supply reel that a short length of magnetic tape cannot be withdrawn therefrom even if the supply reel is locked by pawl 8; and, consequently, the aforementioned difficulty due to excess tape tension is minimal. In one embodiment of the present invention, only about 5 to 6 centimeters of magnetic tape are withdrawn from the compact cassette for loading into the cassette adapter, and such a length can usually be withdrawn without encountering excessive tape tension or breakage.

The unloading of a compact cassette from cassette adapter A will next be described. The cassette adapter containing the compact cassette preferably is first removed from the video cassette recorder, and manually rotatable gear 32 is rotated in a counter-clockwise direction while being pressed downwardly, so that notch 34c of rack 34 is disengaged from detent 36 and moves in the direction indicated by arrow B (FIG. 3(a). Pivot arms 38, 41 pivot in the counter-clockwise direction to return to their respective initial positions (shown in full lines in FIG. 3(a)), and slide lever 40 slides in the direction indicated by arrow D. Shoulder 40c pivots control lever 43 about pin 44 to drive locking lever 45 in the direction of arrow E so as to move lock release pin 46 to release only locking pawl 9 of the compact cassette while locking pawl 8 remains in its locked state. The rotation of gear 32 drives gear 27 to rotate impeller 25 in the clockwise direction via clutch 28, hub 23, and idler 24. Magnetic tape previously tensioned by arms 38, 41 thus is wound on the take-up reel of the compact cassette. After the magnetic tape is completely wound into the compact cassette, locking member 48 may be disengaged to allow the removal of the compact cassette from the cassette adapter.

The rotational speed of impeller 25 is set to be greater than the rotational speed of manually rotatable gear 32 by reason of the gear train comprising gear 27 and hub 23, whereby the magnetic tape is continuously tensioned during the manual rewind operation. If the magnetic tape is wound more quickly on the take-up reel than the pivot speed of arms 38, 41, clutch 28 slips to prevent excessive tension on the magnetic tape 4, thereby preventing the tape from breaking. A directional clutch can also be used so that pivot arm 38, 41 will not pivot unless manually rotatable gear 32 is depressed and rotated.

Typically, a compact cassette is provided with a recessed hole for engagement with control lever 43 or locking lever 45 so that the compact cassette cannot be inadvertently removed from the cassette adapter while magnetic tape is withdrawn from the cassette and loaded into the adapter.

Figure 5:
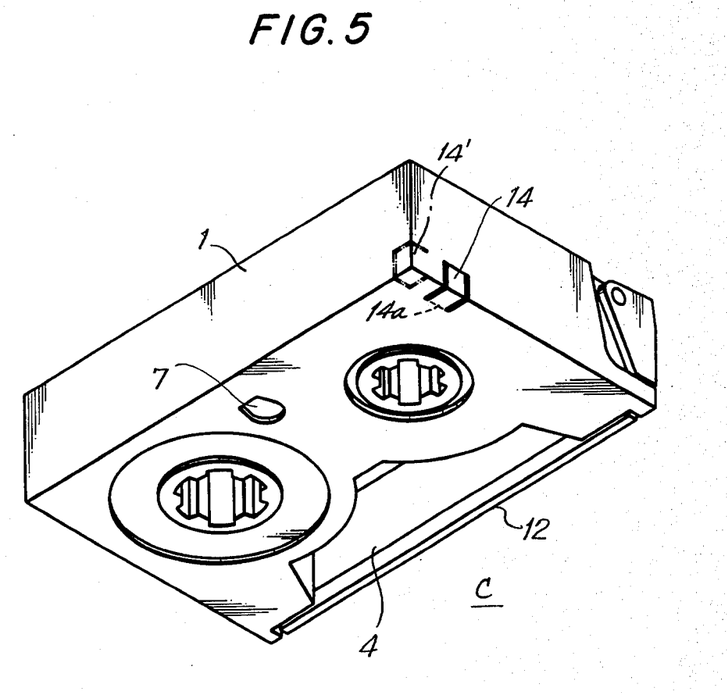
FIG. 5 is a perspective view of a portion of a compact cassette illustrating alternate accidental erase protectors usable therewith.

FIG. 5 illustrates an erase-tab 14 formed in compact cassette C which, when removed along dotted line 14a, results in notches in side and bottom surfaces of the compact cassette. The absence of the erase-tab is detected by horizontal pivotal movement of accidental erasing protector lever 50 to prevent information recorded on the magnetic tape of the compact cassette from being erased or "over-recorded". Alternatively, an erase-tab 14' can be formed at one corner of the compact cassette, as indicated by the broken line of FIG. 5, whose presence or absence may be detected by a suitable mechanism.

According to one embodiment of a cassette adapter of the present invention, the take-up reel rotates to wind a length of magnetic tape which is greater than the length of magnetic tape returned by the pivotal arm. Thus, when the cassette is removed from the cassette adapter, the magnetic tape can be completely wound within the cassette and will not be damaged. If the cassette is provided with a reel locking mechanism, as described above, magnetic tape can be withdrawn from the cassette and loaded into the adapter while retaining the reel locking function of the cassette.

Although a specific embodiment of the present invention has been described in detail herein with reference to the accompanying drawings, it is to be understood that the invention is not limited to that precise embodiment, and that various changes and modifications may be effected therein by one skilled in the art without departing from the spirit and scope of the invention as defined in the appended claims.

What is claimed is:

1. A cassette adapter for use with an information signal recording and/or reproducing apparatus and adapted to receive a smaller than conventional cassette containing magnetic tape wound on supply and take-up reels, said magnetic tape to be withdrawn therefrom, said adapter comprising:
   rotational force transmission means for winding and unwinding said magnetic tape on said take-up reel; and
   crank means driven by said rotational force transmission means for withdrawing said magnetic tape from said smaller than conventional cassette.

2. A cassette adapter for use with an information signal recording and/or reproducing apparatus and adapted to receive a smaller than conventional cassette containing magnetic tape wound on supply and take-up reels, said magnetic tape to be withdrawn therefrom, said adapter comprising:
   rotational force transmission means for winding and unwinding said magnetic tape on said take-up reel; and
   crank means connected to said rotational force transmission means for withdrawing said magnetic tape from said smaller than conventional cassette, wherein the reels of said cassette normally are locked from rotation; and further comprising reel releasing means included in said adapter operative in synchronism with said crank means to a first position for releasing one of said supply and take-up reels for rotation, and operative to a second position for releasing both said reels for rotation.

3. The cassette adapter of claim 2; wherein said crank means includes at least one pivotally movable arm means for engaging said magnetic tape, and slide means connected to said arm means for slidable movement with the pivotal movement of said arm means.

4. The cassette adapter of claim 3; wherein said slide means has a shoulder formed thereon, and wherein said reel releasing means includes control lever means for engaging said shoulder and coupled to said control lever means to be actuated in response to said engagement of said control lever means with said shoulder.

5. The cassette adapter of claim 4; wherein said cassette normally includes a pair of reel-locking pawls for said take-up and supply reels, respectively, and said locking lever means includes a pin for selectively engaging said pawls in said first and second positions, respectively, of said reel releasing means.

6. The cassette adapter of claim 5; wherein said locking lever means is actuable to said first position to release said take-up reel.

7. A cassette adapter for use with an information signal recording and/or reproducing apparatus and adapted to receive a smaller than conventional cassette containing magnetic tape wound on supply and take-up reels, said magnetic tape to be withdrawn therefrom, said adapter comprising:
   rotational force transmission means for winding and unwinding said magnetic tape on said take-up reel; and
   crank means connected to said rotational force transmission means for withdrawing said magnetic tape from said smaller than conventional cassette; wherein said rotational force transmission means includes means for controlling movement of the take-up reel of said cassette and for controlling tension of the magnetic tape in said cassette.

8. The cassette adapter of claim 7; wherein said last-mentioned means is operative to maintain said tension less than the breaking tension of said magnetic tape.

9. The cassette adapter of claim 7; wherein said rotational force transmission means includes manually rotatable gear means; and slidable connecting means connecting said crank means with said manually rotatable gear means for pivoting said crank means in response to rotational movement of said manually rotatable gear means.

10. The cassette adapter of claim 9; wherein said rotational force transmission means further includes hub means for driving the take-up reel of said cassette, gear means coupled to said manually rotatable gear means, and clutch means for coupling said gear means to said hub means.

11. The cassette adapter of claim 10; wherein said manually rotatable gear means comprises a manually rotatable gear for engaging said gear means, a pinion for engaging said connecting means, means associated with said manually rotatable gear for coupling said manually rotatable gear with said pinion, and a spring for normally biasing said manually rotatable gear out of engagement with said gear means and said pinion.

12. The cassette adapter of claim 11; wherein said connecting means is provided with releasable locking means to hold said connecting means from sliding movement.

13. The cassette adapter of claim 1; including a housing for receiving a smaller cassette, the housing having substantially the same dimensions as a cassette normally used with said information signal recording and/or reproducing apparatus.

14. A cassette adapter for use with an information signal recording and/or reproducing apparatus and adapted to receive a smaller than conventional cassette containing magnetic tape wound on supply and take-up reels, said magnetic tape being withdrawable from said smaller than conventional cassette, said adapter comprising:
   crank means for withdrawing said magnetic tape from said smaller cassette; and
   means operable in synchronism with said crank means for controlling movement of at least one of the reels of said smaller cassette during a tape return operation sufficient to maintain said magnetic tape in a continuously tensioned state.

15. A cassette adapter for use with an information signal recording and/or reproducing apparatus and adapted to receive a smaller than conventional cassette containing magnetic tape wound on supply and take-up reels normally locked from rotation, said magnetic tape being withdrawable from said smaller than conventional cassette, said adapter comprising:
   rotational force transmission means for selectively winding and unwinding said magnetic tape one at least one of said reels;
   crank means for withdrawing said magnetic tape from said smaller cassette in response to rotation by said rotational force transmission means; and
   reel releasing means synchronously operable with said crank means to a first position for releasing on of said supply and take-up reels for rotation, and to a second position for releasing both said reels for rotation.

16. A cassette adapter for use with an information signal recording and/or reproducing apparatus and adapted to receive a smaller than conventional cassette containing magnetic tape wound on normally locked supply and take-up reels and withdrawable therefrom, comprising:

crank means for withdrawing said magnetic tape from said smaller cassette;

rotating means for rewinding said magnetic tape on said take-up reel, said rotating means operating in synchronism with said crank means for controlling movement of said take-up reel to prevent said magnetic tape from breaking; and reel unlocking means operating in synchronism with said crank means to a first position for releasing one of said reels for rotation, and to a second position for releasing both said reels for rotation.

* * * * *